United States Patent
Yasuda et al.

(10) Patent No.: US 12,252,500 B2
(45) Date of Patent: *Mar. 18, 2025

(54) PRODUCTION METHOD FOR ORGANIC SILICON COMPOUND HAVING KETIMINE STRUCTURE

(71) Applicant: SHIN-ETSU CHEMICAL CO., LTD., Tokyo (JP)

(72) Inventors: Shigeki Yasuda, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1147 days.

This patent is subject to a terminal disclaimer.

(21) Appl. No.: 17/051,970

(22) PCT Filed: Oct. 10, 2018

(86) PCT No.: PCT/JP2018/037712
§ 371 (c)(1),
(2) Date: Oct. 30, 2020

(87) PCT Pub. No.: WO2019/211921
PCT Pub. Date: Nov. 7, 2019

(65) Prior Publication Data
US 2021/0238206 A1  Aug. 5, 2021

(30) Foreign Application Priority Data

May 1, 2018 (JP) ................. 2018-088059

(51) Int. Cl.
C07F 7/18 (2006.01)
C07F 7/08 (2006.01)
C07F 7/20 (2006.01)

(52) U.S. Cl.
CPC ............ C07F 7/1892 (2013.01); C07F 7/081 (2013.01); C07F 7/20 (2013.01)

(58) Field of Classification Search
CPC .. C07F 7/1892; C07F 7/04; C07F 7/10; C07F 7/1804; C07F 7/20; C07F 7/1872
See application file for complete search history.

(56) References Cited

U.S. PATENT DOCUMENTS

| | | | | |
|---|---|---|---|---|
| 2,942,019 A | * | 6/1960 | Pike | ................ C07F 7/0838 |
| | | | | 210/698 |
| 4,064,155 A | | 12/1977 | Speier | |
| 4,832,748 A | * | 5/1989 | Tawara | ............... C08G 59/4085 |
| | | | | 106/287.11 |
| 2004/0138356 A1 | * | 7/2004 | Miyata | ..................... C08J 7/043 |
| | | | | 524/502 |
| 2010/0130764 A1 | * | 5/2010 | Taniguchi | ............ C08K 5/5465 |
| | | | | 556/424 |

(Continued)

FOREIGN PATENT DOCUMENTS

| | | |
|---|---|---|
| JP | 52-78834 A | 7/1977 |
| JP | 07247295 A * | 9/1995 |

(Continued)

OTHER PUBLICATIONS

T. Kupiec, "Quality-control analytical methods: Gas chromatography." International Journal of Pharmaceutical Compounding 8 (2004): 305-309 (Year: 2004).*
F. Cao et al., 23 Environ Sci Pollut Res, 12303-12311 (2016) (Year: 2016).*
International Search Report, issued in PCT/JP2018/037712, PCT/ISA/210, dated Jan. 8, 2019.
Written Opinion of the International Searching Authority, issued in PCT/JP2018/037712, PCT/ISA/237, dated Jan. 8, 2019.
Extended European Search Report for European Application No. 18917247.1, dated Jan. 28, 2022.

(Continued)

*Primary Examiner* — Alexander R Pagano
(74) *Attorney, Agent, or Firm* — Birch, Stewart, Kolasch & Birch, LLP

(57) ABSTRACT

An organic silicon compound having a ketimine structure having good storage stability can be obtained by a production method that produces an organic silicon compound having a ketimine structure indicated by formula (1)

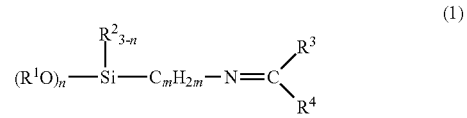

(1)

$R^1$ and $R^2$ each independently indicating a C1-10 alkyl group or a C6-10 aryl group, $R^3$ and $R^4$ each independently indicating a hydrogen atom, a C1-10 alkyl group, or a C6-10 aryl group, n indicating an integer of 1-3, and m indicating an integer of 1-12. The method includes steps (I) and (II) and has a chlorine atom content relative to the organic silicon compound indicated by formula (1) of less than 0.1 mass ppm. Step (I): an amino group-containing silicon compound indicated by formula (2) and a carbonyl compound indicated by formula (3) are caused to react.

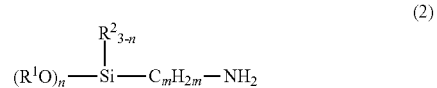

(2)

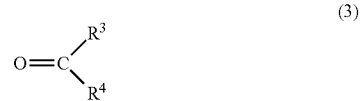

(3)

$R^1$-$R^4$, n, and m are as described above. Step (II): the chlorine atom content is reduced.

17 Claims, No Drawings

(56) References Cited

U.S. PATENT DOCUMENTS

| | | | | |
|---|---|---|---|---|
| 2012/0270961 A1* | 10/2012 | Kotani | ................... | C08L 33/08 |
| | | | | 522/18 |
| 2017/0096589 A1* | 4/2017 | Hirokami | ........... | C08G 18/4825 |
| 2018/0016287 A1* | 1/2018 | Cruse | ....................... | C07F 7/20 |
| 2020/0148707 A1* | 5/2020 | Burckhardt | ........... | C07F 7/1804 |
| 2023/0059783 A1* | 2/2023 | Yasuda | ................ | C07F 7/1892 |
| 2023/0103534 A1* | 4/2023 | Yasuda | ................ | C07F 7/1804 |
| | | | | 556/413 |

FOREIGN PATENT DOCUMENTS

| | | | |
|---|---|---|---|
| JP | 11-349632 A | 12/1999 | |
| JP | 2003-171384 A | 6/2003 | |
| WO | WO 2007/034987 A1 | 3/2007 | |
| WO | WO-2008133265 A1 * | 11/2008 | ........... C08G 65/336 |

\* cited by examiner

PRODUCTION METHOD FOR ORGANIC SILICON COMPOUND HAVING KETIMINE STRUCTURE

TECHNICAL FIELD

This invention relates to a method for preparing an organosilicon compound having a ketimine structure.

BACKGROUND ART

Silane coupling agents are compounds including both a moiety which is reactive with inorganic matter (i.e., silicon-bonded hydrolyzable group) and another moiety which is fully reactive with and soluble in organic matter, within their molecule. They are widely used as a resin modifier.

Among these, silane coupling agents having a ketimine structure are under study as a modifier for conjugated diene copolymers (Patent Document 1).

The ketimine structure-bearing organosilicon compounds, however, have poor storage stability and turn to active hydrogen-containing organosilicon compounds with a lapse of time, which can adversely affect a composition having the relevant compound admixed.

It is thus desired to improve the storage stability of ketimine structure-bearing organosilicon compounds.

PRIOR ART DOCUMENTS

Patent Documents

Patent Document 1: JP-A H11-349632

SUMMARY OF INVENTION

Technical Problem

An object of the invention, which has been made under the above-mentioned circumstances, is to provide a method for preparing a ketimine structure-bearing organosilicon compound which is improved in storage stability.

Solution to Problem

Making extensive investigations to attain the above object, the inventors have found that a ketimine structure-bearing organosilicon compound having good storage stability can be obtained by reducing the chlorine content. The invention is predicated on this finding.

The invention is defined below.

1. A method for preparing an organosilicon compound having a ketimine structure, represented by the following formula (1):

[Chem. 1]

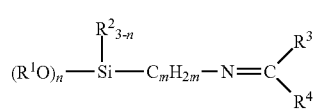

(1)

wherein $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ and $R^4$ are each independently hydrogen or a $C_1$-$C_{10}$ alkyl or $C_6$-$C_{10}$ aryl group, n is an integer of 1 to 3, and m is an integer of 1 to 12, said method comprising the steps of:

(I) reacting an amino-containing organosilicon compound having the following formula (2) with a carbonyl compound having the following formula (3):

[Chem. 2]

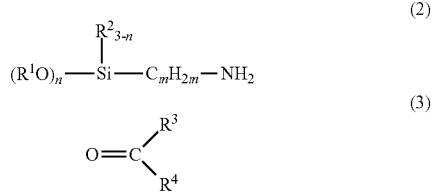

wherein $R^1$, $R^2$, $R^3$, $R^4$, n, and m are as defined above, and (II) reducing a chlorine content,
the chlorine content being reduced to less than 0.1 ppm by weight based on the organosilicon compound having formula (1).

2. The method of 1 wherein step (II) is conducted after step (I).

3. The method of 1 or 2 wherein step (II) of reducing a chlorine content includes using an inorganic adsorbent.

4. The method of 3 wherein the inorganic adsorbent is at least one compound selected from silica, aluminum hydroxide, hydrotalcite, magnesium silicate, aluminum silicate, aluminum oxide, and magnesium oxide.

5. The method of any one of 1 to 4 wherein $R^1$ is methyl or ethyl, $R^3$ is isobutyl, $R^4$ is methyl, and both m and n are 3.

6. An organosilicon compound having the following formula (1):

[Chem. 3]

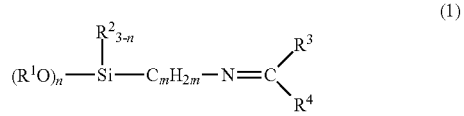

(1)

wherein $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ and $R^4$ are each independently hydrogen or a $C_1$-$C_{10}$ alkyl or $C_6$-$C_{10}$ aryl group, n is an integer of 1 to 3, and m is an integer of 1 to 12, said organosilicon compound having a chlorine content of less than 0.1 ppm by weight.

Advantageous Effects of Invention

The preparation method of the invention is successful in forming a ketimine structure-bearing organosilicon compound having good storage stability.

DESCRIPTION OF EMBODIMENTS

Now the invention is described in detail.

The invention provides a method for preparing a ketimine structure-bearing organosilicon compound, specifically a method for preparing a ketimine structure-bearing organosilicon compound having the following general formula (1), the method comprising the following steps (I) and (II), characterized in that the chlorine content is reduced to less than 0.1 ppm by weight based on the ketimine structure-bearing organosilicon compound.

[Chem. 4]

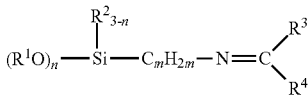

(1)

Step (I): reacting an amino-containing organosilicon compound having the following formula (2) with a carbonyl compound having the following formula (3)

Step (II): reducing a chlorine content

[Chem. 5]

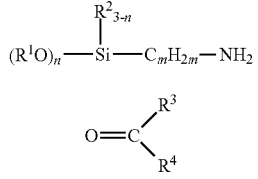

(2)

(3)

In the formulae, $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, and $R^3$ and $R^4$ are each independently hydrogen or a $C_1$-$C_{10}$ alkyl or $C_6$-$C_{10}$ aryl group.

The $C_1$-$C_{10}$ alkyl group may be straight, branched or cyclic, and examples thereof include methyl, ethyl, n-propyl, isopropyl, n-butyl, isobutyl, s-butyl, t-butyl, n-pentyl, neopentyl, n-hexyl, n-heptyl, n-octyl, n-nonyl, n-decyl, cyclopropyl, cyclobutyl, cyclopentyl, cyclohexyl, cycloheptyl, and cyclooctyl.

Examples of the $C_6$-$C_{10}$ aryl group include phenyl, α-naphthyl, and β-naphthyl.

Of these, $R^1$ and $R^2$ are preferably selected from straight alkyl groups, with methyl and ethyl being more preferred.

$R^3$ and $R^4$ are preferably selected from hydrogen and $C_1$-$C_6$ alkyl groups, more preferably methyl, ethyl, n-propyl, n-butyl, and isobutyl, even more preferably methyl and isobutyl, with a combination of methyl and isobutyl being most preferred.

The subscript n is an integer of 1 to 3, preferably 2 or 3, and more preferably 3.

The subscript m is an integer of 1 to 12, preferably 2 or 3, and more preferably 3.

In the invention, organosilicon compounds having the following formulae (4) and (5) are preferred.

[Chem. 6]

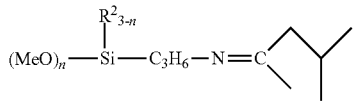

(4)

(5)

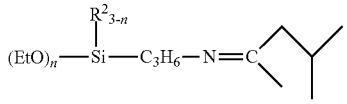

Herein $R^2$ and n are as defined above, Me is methyl, and Et is ethyl.

Examples of the amino-containing organosilicon compound having formula (2) used in step (I) include 3-aminopropyltrimethoxysilane, 3-aminopropyldimethoxymethylsilane, and 3-aminopropyltriethoxysilane.

Examples of the carbonyl compound having formula (3) include dimethyl ketone, methyl ethyl ketone, methyl isobutyl ketone, acetaldehyde, benzaldehyde, and propionaldehyde.

In step (I), the reaction of the amino-containing organosilicon compound with the carbonyl compound is preferably performed under such conditions that the carbonyl compound is in excess in molar ratio.

Although the reaction takes place in a solventless system, a solvent may be used. Suitable solvents include hydrocarbon solvents such as pentane, hexane, cyclohexane, heptane, isooctane, benzene, toluene, and xylene. These solvents may be used alone or in admixture of two or more. Of these, toluene is preferred.

In step (I), the water formed by reaction of the amino-containing organosilicon compound with the carbonyl compound must be removed from the reaction system.

Although the method of water removal is not particularly limited, the water is preferably distilled off by refluxing the carbonyl compound in excess in the system or the solvent by means of a Dean-Stark setup or the like.

The reaction temperature is not particularly limited as long as water can be distilled off. Preferred reaction temperature is 100° C. to 200° C.

Since the ketimine structure-bearing organosilicon compound having formula (1) is improved in storage stability by reducing the chlorine content thereof, treatment for reducing the chlorine content is performed as step (II) in the invention.

The treatment used herein for reducing the chlorine content is not particularly limited. Exemplary treatments include purification by distilling, addition of alkali metal alkoxides, and adsorption by inorganic adsorbents. In the invention, these treatments may be performed alone or in combination of two or more. A step including adsorption treatment by an inorganic adsorbent is preferred.

Suitable inorganic adsorbents used for reducing the chlorine content include silica, aluminum hydroxide, hydrotalcite, magnesium silicate, aluminum silicate, aluminum oxide, magnesium oxide, and solid solutions of aluminum oxide and magnesium oxide, which may be used alone or in combination of two or more.

The inorganic adsorbents are commercially available, for example, as Kyoward series (Kyoward 100, 200, 300, 500, 600, 700, and 2000) from Kyowa Chemical Industry Co., Ltd. Of these, Kyoward 500 which is a synthetic hydrotalcite ($Mg_6Al_2(OH)_{16}CO_3 \cdot mH_2O$) is especially preferred from the aspect of treatment efficiency.

The inorganic adsorbent is preferably used in an amount of 0.005 to 5.0 parts by weight, more preferably 0.01 to 0.2 part by weight based on 100 parts by weight of the organosilicon compound having formula (1) from the aspects of high treatment efficiency and easy removal of the inorganic adsorbent after treatment.

Independent of whether the preparation method of the invention starts with either of steps (I) and (II), there is obtained a ketimine structure-bearing organosilicon compound having good storage stability as intended in the invention. Preferably step (I) precedes because the order from step (I) to step (II) is effective for reducing the reaction time of step (I).

When step (II) precedes, at least one of the amino-containing organosilicon compound of formula (2) and the compound of formula (3) to be used as reactants in step (I) may be treated for reducing the chlorine content. The treatment of the compound of formula (2) is preferred.

If the chlorine content after reduction is 0.1 ppmw or more, the organosilicon compound of formula (1) has poor storage stability. In the case of an organosilicon compound having the formula (7), for example, organosilicon compounds of the formulae (8) to (11) form with a lapse of time.

[Chem. 7]

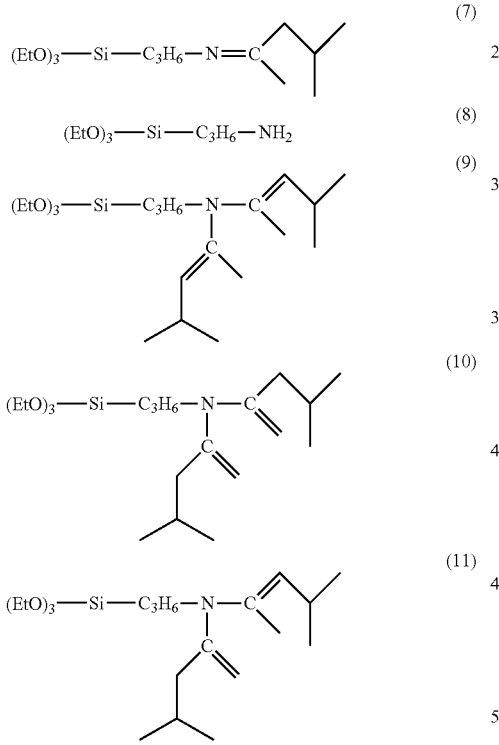

With this in mind, the preparation method of the invention involves step (II) of reducing the chlorine content of the final ketimine structure-bearing organosilicon compound to less than 0.1 ppmw for thereby improving the storage stability of the compound. Step (II) may be repeated plural times until the chlorine content is reduced below 0.1 ppmw.

For the purpose of further improving the storage stability, the compound having formula (1) is preferably purified by distillation to a purity of at least 98%.

EXAMPLES

Examples and Comparative Examples are given below for further illustrating the invention although the invention is not limited thereto.

The chlorine content was measured by the following method.

Chlorine Content

After 10 g of each of the samples obtained in Examples and Comparative Examples or 3-aminopropyltrimethoxysilane, 50 ml of toluene and 20 ml of deionized water were mixed, stirring was continued for 1 hour. The water layer was taken out. The concentration of water-soluble chloride ions in the water layer was measured by ion chromatography under the following conditions and reported as the chlorine content.

Ion chromatograph: ICA-2000 by DKK-TOA Corp.
Separation column: TOA-DKK PCI-230
Guard column: TOA-DKK PCI-205G
Suppressor: chemical suppressor 6810690K
Detector: electrical conductivity detector
Eluent: 4 mmol/L $Na_2CO_3$, 2 mmol/L $NaHCO_3$
Eluent amount: 0.9 mL/min
Injection volume: 100 μL
Injection port temperature: 250° C.
Detector temperature: 300° C.
Carrier gas: He
Carrier gas flow rate: 3.0 mL/min

[Example 1] Preparation of Organosilicon Compound (6)

[Chem. 8]

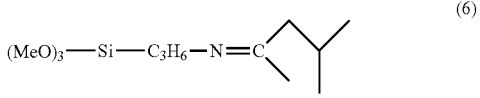

A 5-L separable flask equipped with a stirrer, reflux condenser, dropping funnel, and thermometer was charged with 2,028 g (18.4 moles) of methyl isobutyl ketone. To the flask, 540 g (3.01 moles) of 3-aminopropyltrimethoxysilane having a chlorine content of 5 ppm was added dropwise at an internal temperature of 105-110° C. over 1 hour. Stirring was continued for 6 hours at 115° C. During dropwise addition and aging, the water formed was removed by refluxing with the methyl isobutyl ketone. On analysis by gas chromatography, the disappearance of the peaks assigned to 3-aminopropyltrimethoxysilane was observed. After aging, there was obtained 1,660 g of a pale yellow clear liquid (step (I)).

Then, 1.7 g (0.1 part by weight) of Kyoward 100 (Kyowa Chemical Industry Co., Ltd., the same hereinafter) was added to the resulting solution, which was stirred in a nitrogen atmosphere at room temperature for 6 hours. The Kyoward 100 was then removed from the solution by filtration under pressure (step (II)). The solution was purified by distillation under conditions of 10 Torr and 170° C., yielding 693 g of a colorless clear liquid. On $^1$H-NMR analysis, the liquid was identified to be an organosilicon compound having the above formula (6).

Example 2

An organosilicon compound having formula (6) was prepared as in Example 1 aside from using the same part by weight of Kyoward 200 instead of Kyoward 100.

Example 3

An organosilicon compound having formula (6) was prepared as in Example 1 aside from using the same part by weight of Kyoward 300 instead of Kyoward 100.

Example 4

An organosilicon compound having formula (6) was prepared as in Example 1 aside from using the same part by weight of Kyoward 500 instead of Kyoward 100.

Example 5

An organosilicon compound having formula (6) was prepared as in Example 1 aside from using the same part by weight of Kyoward 600 instead of Kyoward 100.

Example 6

An organosilicon compound having formula (6) was prepared as in Example 1 aside from using the same part by weight of Kyoward 700 instead of Kyoward 100.

Example 7

An organosilicon compound having formula (6) was prepared as in Example 1 aside from using the same part by weight of Kyoward 2000 instead of Kyoward 100.

Example 8

A 1-L separable flask equipped with a stirrer was charged with 600 g of 3-aminopropyltrimethoxysilane having a chlorine content of 5 ppm and 0.60 g (0.1 part by weight) of Kyoward 100. The contents were stirred in a nitrogen atmosphere at room temperature for 6 hours and then filtered under pressure to remove the Kyoward 100 from the 3-aminopropyltrimethoxysilane (step (II)). It was confirmed that the chlorine content was less than 0.1 ppm.

A 5-L separable flask equipped with a stirrer, reflux condenser, dropping funnel, and thermometer was charged with 2,028 g (18.4 moles) of methyl isobutyl ketone. To the flask, 540 g (3.01 moles) of the above 3-aminopropyltrimethoxysilane was added dropwise at an internal temperature of 105-110° C. over 1 hour. Stirring was continued for 12 hours at 115° C. During dropwise addition and aging, the water formed was removed by refluxing with the methyl isobutyl ketone. On analysis by gas chromatography, the disappearance of the peaks assigned to 3-aminopropyltrimethoxysilane was observed. After aging, there was obtained 1,650 g of a pale yellow clear liquid (step (I)).

The solution was purified by distillation under conditions of 10 Torr and 170° C., yielding 690 g of a colorless clear liquid. On $^1$H-NMR analysis, the liquid was identified to be an organosilicon compound having formula (6).

Comparative Example 1

An organosilicon compound having formula (6) was prepared as in Example 1 aside from omitting step (II) of using Kyoward 100.

[Example 9] Preparation of Organosilicon Compound (7)

[Chem. 9]

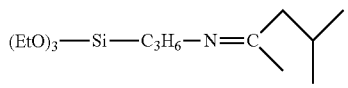

(7)

A 5-L separable flask equipped with a stirrer, reflux condenser, dropping funnel, and thermometer was charged with 2,028 g (18.4 moles) of methyl isobutyl ketone. To the flask, 667 g (3.01 moles) of 3-aminopropyltriethoxysilane having a chlorine content of 5 ppm was added dropwise at an internal temperature of 105-110° C. over 1 hour. Stirring was continued for 6 hours at 115° C. During dropwise addition and aging, the water formed was removed by refluxing with the methyl isobutyl ketone. On analysis by gas chromatography, the disappearance of the peaks assigned to 3-aminopropyltriethoxysilane was observed. After aging, there was obtained 2,070 g of a pale yellow clear liquid (step (I)).

Then, 2.1 g (0.1 part by weight) of Kyoward 100 was added to the resulting solution, which was stirred in a nitrogen atmosphere at room temperature for 6 hours. The Kyoward 100 was then removed from the solution by filtration under pressure (step (II)).

The solution was purified by distillation under conditions of 10 Torr and 170° C., yielding 802 g of a colorless clear liquid. On $^1$H-NMR analysis, the liquid was identified to be an organosilicon compound having the above formula (7).

Example 10

An organosilicon compound having formula (7) was prepared as in Example 9 aside from using the same part by weight of Kyoward 200 instead of Kyoward 100.

Example 11

An organosilicon compound having formula (7) was prepared as in Example 9 aside from using the same part by weight of Kyoward 300 instead of Kyoward 100.

Example 12

An organosilicon compound having formula (7) was prepared as in Example 9 aside from using the same part by weight of Kyoward 500 instead of Kyoward 100.

Example 13

An organosilicon compound having formula (7) was prepared as in Example 9 aside from using the same part by weight of Kyoward 600 instead of Kyoward 100.

Example 14

An organosilicon compound having formula (7) was prepared as in Example 9 aside from using the same part by weight of Kyoward 700 instead of Kyoward 100.

Example 15

An organosilicon compound having formula (7) was prepared as in Example 9 aside from using the same part by weight of Kyoward 2000 instead of Kyoward 100.

Example 16

A 1-L separable flask equipped with a stirrer was charged with 700 g of 3-aminopropyltriethoxysilane having a chlorine content of 5 ppm and 0.70 g (0.1 part by weight) of Kyoward 100. The contents were stirred in a nitrogen atmosphere at room temperature for 6 hours and then filtered under pressure to remove the Kyoward 100 from the 3-aminopropyltriethoxysilane (step (II)).

A 5-L separable flask equipped with a stirrer, reflux condenser, dropping funnel, and thermometer was charged with 2,028 g (18.4 moles) of methyl isobutyl ketone. To the flask, 667 g (3.01 moles) of the above 3-aminopropyltriethoxysilane was added dropwise at an internal temperature of 105-110° C. over 1 hour. Stirring was continued for 12 hours at 115° C. During dropwise addition and aging, the water formed was removed by refluxing with the methyl isobutyl ketone. On analysis by gas chromatography, the disappearance of the peaks assigned to 3-aminopropyltriethoxysilane was observed. After aging, there was obtained 2,060 g of a pale yellow clear liquid (step (I)).

The solution was purified by distillation under conditions of 10 Torr and 170° C., yielding 810 g of a colorless clear liquid. On $^1$H-NMR analysis, the liquid was identified to be an organosilicon compound having formula (7).

Comparative Example 2

An organosilicon compound having formula (7) was prepared as in Example 9 aside from omitting step (II) of using Kyoward 100.

The organosilicon compounds obtained in Examples and Comparative Examples were measured for a chlorine content by the above-mentioned method. The results are shown in Table 1.

Closed containers were filled with the organosilicon compounds obtained in Examples and Comparative Examples and stored at 25° C. The purity immediately after purification by distilling and after 6 months of storage was measured by gas chromatography under the following conditions. The results are also shown in Table 1.

Purity Measurement

Gas chromatograph: HP7890B by Agilent Technologies, Inc.

Detector: thermal conductivity detector (TCD)

Column: DB-5 (30 cm long×0.530 mm ID×1.50 μm film thick)

Column temperature: 100° C. 15° C./min ramp 300° C. (10 min holding) measurement time: 23.3 min in total Injection port temperature: 250° C.

Detector temperature: 300° C.

Carrier gas: He

Carrier gas flow rate: 3.0 mL/min

TABLE 1

| | | | | | Purity (%) | |
|---|---|---|---|---|---|---|
| | Organosilicon compound | Adsorbent, Kyowaad No. | Step (I), reaction time (h) | Cl content (ppm) | Immediately after purification by distilling | After 6 months |
| Example 1 | (6) | 100 | 6 | <0.1 | 99.4 | 98.7 |
| Example 2 | (6) | 200 | 6 | <0.1 | 99.1 | 98.5 |
| Example 3 | (6) | 300 | 6 | <0.1 | 99.2 | 98.6 |
| Example 4 | (6) | 500 | 6 | <0.1 | 99.2 | 98.9 |
| Example 5 | (6) | 600 | 6 | <0.1 | 99.3 | 98.9 |
| Example 6 | (6) | 700 | 6 | <0.1 | 99.5 | 98.5 |
| Example 7 | (6) | 2000 | 6 | <0.1 | 99.2 | 98.6 |
| Example 8 | (6) | 100 | 12 | <0.1 | 99.2 | 98.9 |
| Comparative Example 1 | (6) | — | 6 | 0.2 | 99.0 | 95.1 |
| Example 9 | (7) | 100 | 6 | <0.1 | 99.5 | 98.6 |
| Example 10 | (7) | 200 | 6 | <0.1 | 99.4 | 98.7 |
| Example 11 | (7) | 300 | 6 | <0.1 | 99.4 | 98.6 |
| Example 12 | (7) | 500 | 6 | <0.1 | 99.1 | 99.0 |
| Example 13 | (7) | 600 | 6 | <0.1 | 99.4 | 98.8 |
| Example 14 | (7) | 700 | 6 | <0.1 | 99.7 | 98.9 |
| Example 15 | (7) | 2000 | 6 | <0.1 | 99.2 | 98.6 |
| Example 16 | (7) | 100 | 12 | <0.1 | 99.4 | 99.0 |
| Comparative Example 2 | (7) | — | 6 | 0.3 | 99.1 | 95.7 |

As seen from Table 1, the organosilicon compounds in Examples obtained by the preparation method of the invention have a chlorine content reduced below 0.1 ppmw and experience only a little drop of purity even after long-term storage, indicating high storage stability.

The invention claimed is:

1. A method for preparing an organosilicon compound having a ketimine structure, represented by the following formula (1):

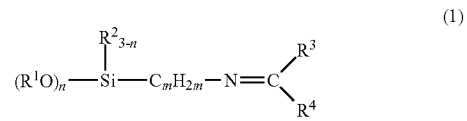

(1)

wherein $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ and $R^4$ are each independently hydrogen or a $C_1$-$C_{10}$ alkyl or $C_6$-$C_{10}$ aryl group, n is an integer of 1 to 3, and m is an integer of 1 to 12, said method comprising the steps of:

(I) reacting an amino-containing organosilicon compound having the following formula (2) with a carbonyl compound having the following formula (3):

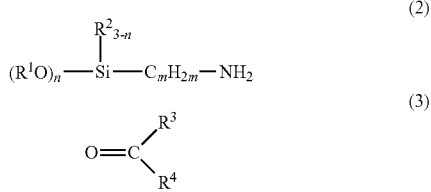

wherein $R^1$, $R^2$, $R^3$, $R^4$, n, and m are as defined above, and (II) reducing a chlorine content, the chlorine content being reduced to less than 0.1 ppm by weight based on the organosilicon compound having formula (1), wherein step (II) of reducing a chlorine content includes using an inorganic adsorbent being hydrotalcite.

2. The method of claim 1 wherein step (II) is conducted after step (I).

3. The method of claim 1 wherein $R^1$ is methyl or ethyl, $R^3$ is isobutyl, $R^4$ is methyl, and both m and n are 3.

4. The method of claim 1 wherein said hydrotalcite is synthetic hydrotalcite.

5. The method of claim 1 wherein said inorganic absorbent is used in an amount of 0.005 to 5.0 parts by weight based on 100 parts by weight of the organosilicon compound having formula (1).

6. The method of claim 1 wherein said inorganic absorbent is used in an amount of 0.0.01 to 0.2 part by weight based on 100 parts by weight of the organosilicon compound having formula (1).

7. The method of claim 2 wherein said hydrotalcite is synthetic hydrotalcite.

8. The method of claim 2 wherein said inorganic absorbent is used in an amount of 0.005 to 5.0 parts by weight based on 100 parts by weight of the organosilicon compound having formula (1).

9. The method of claim 2 wherein said inorganic absorbent is used in an amount of 0.0.01 to 0.2 part by weight based on 100 parts by weight of the organosilicon compound having formula (1).

10. The method of claim 1, wherein, in step (I), water formed by reaction of the amino-containing organosilicon compound with the carbonyl compound is removed from the reaction system.

11. The method of claim 2, wherein, in step (I), water formed by reaction of the amino-containing organosilicon compound with the carbonyl compound is removed from the reaction system.

12. The method of claim 3, wherein, in step (I), water formed by reaction of the amino-containing organosilicon compound with the carbonyl compound is removed from the reaction system.

13. The method of claim 5, wherein, in step (I), water formed by reaction of the amino-containing organosilicon compound with the carbonyl compound is removed from the reaction system.

14. The method of claim 6, wherein, in step (I), water formed by reaction of the amino-containing organosilicon compound with the carbonyl compound is removed from the reaction system.

15. The method of claim 1, wherein the compound having formula (1) is purified by distillation to a purity of at least 98%.

16. The method of claim 2, wherein the compound having formula (1) is purified by distillation to a purity of at least 98%.

17. The method of claim 10, wherein the compound having formula (1) is purified by distillation to a purity of at least 98%.

* * * * *